(12) United States Patent
Kobayashi et al.

(10) Patent No.: US 6,533,002 B1
(45) Date of Patent: Mar. 18, 2003

(54) FUEL TANK SYSTEM

(75) Inventors: Masahide Kobayashi, Aichi-ken (JP); Takashi Ishikawa, Okazaki (JP); Katsuyuki Kido, Seto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/702,727

(22) Filed: Nov. 1, 2000

(30) Foreign Application Priority Data

| Nov. 11, 1999 | (JP) | 11-320667 |
| Nov. 19, 1999 | (JP) | 11-329272 |
| Jan. 24, 2000 | (JP) | 2000-014465 |
| Jan. 25, 2000 | (JP) | 2000-015957 |

(51) Int. Cl.$^7$ .............. B65B 1/04; B65B 3/04; B67C 3/00
(52) U.S. Cl. ............. 141/302; 141/44; 141/46; 141/59; 141/82; 141/198
(58) Field of Search .............. 141/59, 94, 83, 141/207, 285, 392, 44–46, 52, 53, 128, 192, 198, 302–304; 123/198 DC; 137/43, 202, 587; 220/86.2

(56) References Cited

U.S. PATENT DOCUMENTS

| 4,781,218 A | * 11/1988 | Mori et al. ........... 137/202 |
| 5,329,164 A | * 7/1994 | Saito ............... 123/198 DC |
| 5,590,697 A | * 1/1997 | Benjey et al. ........... 137/202 |
| 5,720,327 A | * 2/1998 | Foster, Jr. ........ 123/198 DC |

FOREIGN PATENT DOCUMENTS

| JP | 57-168760 | 10/1982 |
| JP | 61-39629 | 3/1986 |
| JP | 63-212756 | 9/1988 |
| JP | 3-20503 | 5/1991 |
| JP | 5-332204 | 12/1993 |
| JP | 6-200839 | 7/1994 |
| JP | 8-121279 | 5/1996 |
| JP | 9-242622 | 9/1997 |
| JP | 11-93784 | 4/1999 |

* cited by examiner

Primary Examiner—Timothy L. Maust
(74) Attorney, Agent, or Firm—Finnegan, Henderson, Farabow, Garrett & Dunner, L.L.P.

(57) ABSTRACT

A cooling unit is mounted to an upper wall of a fuel tank so as to cool fuel. A control valve and a vent valve are disposed in a vapor line extending from a float valve to a canister. The control valve and the vent valve are disposed in parallel with one another and constitute a valve member. A cooling unit is mounted to an evaporation passage between a float valve and the valve member. Operation of the cooling units serves to cool fuel and inhibit generation of vapor. If the pressure in the fuel tank exceeds a control pressure, a control circuit opens the control valve and performs control such that the pressure in the fuel tank becomes lower than a running-state relief pressure.

4 Claims, 8 Drawing Sheets

FUEL TANK SYSTEM

INCORPORATION BY REFERENCE

The disclosures of Japanese Patent Application Nos. HEI 11-320667 filed on Nov. 11, 1999, HEI 11-329272 filed on Nov. 19, 1999, 2000-015957 filed on Jan. 25, 2000 and 2000-014465 filed on Jan. 24, 2000, including the specifications, drawings and abstracts are incorporated herein by reference in their entirety.

BACKGROUND OF THE INVENTION

1. Field of the Invention

The present invention relates to a fuel tank system and, more particularly, to a fuel tank system which is installed in a vehicle such as an automobile.

2. Description of the Related Art

Among fuel tank systems installed in a vehicle such as an automobile according to the related art, there is one employing a construction for reducing fuel vapor gas (vapor) generated from the interior of a fuel tank. Japanese Utility Model Publication No. SHO 57-168760 discloses one such example.

As shown in FIG. 8, in this fuel tank system, a conduit for communication between a fuel tank 210 and a canister 212 is provided with a check valve 216 for suitably maintaining a pressure in the fuel tank 210. In addition, a cooling device 220 is assembled with a conduit 214 between an air chamber 218 of the fuel tank 210 and the check valve 216. Thereby part of the vapor discharged from the fuel tank 210 through the conduit 214 is condensed by the cooling device 220 and returned to the fuel tank 210. Thus, the amount of vapor introduced into the canister 212 can be reduced.

However, in a fuel tank system having such a construction, since the opening pressure for the check valve 216 is set regardless of operation of the cooling device 220, it is difficult to efficiently condense vapor in accordance with the cooling capacity of the cooling device 220.

Also, it is necessary to set a large capacity for the canister 212 in consideration of the case where a large amount of vapor has flown into the canister 212 with the check valve 216 open.

SUMMARY OF THE INVENTION

It is an object of the present invention to obtain a fuel tank system capable of reducing an amount of vapor fuel to be adsorbed in a canister and making the canister compact.

According to a first aspect of the present invention, there is provided a fuel tank system comprising a fuel tank which accommodates fuel, a canister which communicates with the fuel tank through an evaporation passage, a valve member which is provided in the evaporation passage and which is opened when the system assumes a predetermined state, and cooling means which is provided in the fuel tank or in the evaporation passage from the fuel tank to the valve member and which operates at least until the system assumes the predetermined state.

That is, in this fuel tank system, the valve member remains closed and the cooling means is in operation until the system assumes the predetermined state. Then, if the system assumes the predetermined state, the valve member is opened and vapor is introduced into the canister. Thus, generation of vapor can efficiently be inhibited in accordance with the cooling capacity of the cooling means.

Further, by activating the cooling means, the amount of vapor introduced into the canister is reduced. Thus, it is possible to make the canister compact and reduce the amount of emission substances.

The cooling means may be provided either in the fuel tank or in the evaporation passage from the fuel tank to the valve member. In addition, it is also possible to provide the cooling means in both of them. In the case where the cooling means is provided in the fuel tank, it is possible to directly inhibit evaporation of fuel by cooling liquid fuel. In the case where the cooling means is provided in the evaporation passage from the fuel tank to the valve member, it is possible to reduce the amount of vapor introduced into the canister.

In the aforementioned aspect of the present invention, the predetermined state for opening the valve member may be a state of a high temperature which exceeds a predetermined temperature that has been set in advance.

Thus, the valve member remains closed and the cooling means is in operation until a the temperature exceeds the predetermined temperature that has been set in advance. In a state of a high temperature exceeding the predetermined temperature, the valve member is opened. This makes it possible to efficiently inhibit generation of vapor.

In the aforementioned aspect of the present invention, the predetermined state for opening the valve member may be a state of a high pressure which exceeds a predetermined pressure that has been set in advance.

Thus, the valve member remains closed and the cooling means is in operation until the pressure exceeds the predetermined pressure that has been set in advance. In a state of a high pressure exceeding the predetermined pressure, the valve member is opened. This makes it possible to efficiently inhibit generation of vapor.

In the aforementioned aspect of the present invention, refueling detection means for detecting a refueling state of the fuel tank may be provided, and the predetermined state may be a refueling state detected by the refueling detection means.

Thus, the valve member is closed in a state where the refueling detection means has not detected a refueling state (a state where no fuel is being refueled). If the refueling detection means has detected a refueling state, the valve member is opened and vapor is introduced into the canister. Also in this case, the amount of vapor introduced into the canister is reduced by activating the cooling means. Thus, it is possible to make the canister compact and reduce the amount of emission substances.

In the aforementioned aspect of the present invention, the valve member may include a control valve which is controlled by control means and a vent valve which is set to an open-valve pressure higher than a minimum open-valve pressure of the control valve.

Thus, regardless of the predetermined state (the high-temperature state, the high-pressure state or the refueling state), the control valve can be controlled by the control means and closed. While the control valve is thus closed, even if the pressure in the fuel tank has become higher than a minimum open-valve pressure of the control valve, the open-valve pressure of the vent valve is set higher than the minimum open-valve pressure of the control valve. Therefore, the vent valve remains closed until it reaches its own open-valve pressure. For example, even if the interior of the fuel tank has reached a high pressure in a parked state of the vehicle, it is possible to prevent vapor from being discharged from the fuel tank.

According to a second aspect of the present invention, there is provided a vapor gas inhibiting device for a fuel tank comprising a control valve which is disposed in a communication passage by which a fuel tank communicates with a canister, a control device which performs open-close control of the control valve in accordance with a state of a vehicle, and pressure detection means which detects an internal pressure of the fuel tank, wherein the control device controls the control valve such that a speed of change in internal pressure of the fuel tank becomes equal to or smaller than a predetermined value, based on an output value of the pressure detection means.

Thus, the control device controls the control valve such that the speed of change in internal pressure of the fuel tank becomes equal to or smaller than a predetermined value, based on an output value of pressure detection means for detecting an internal pressure of the fuel tank. As a result, the speed at which vapor is discharged from the interior of the fuel tank can be limited to a value that enables vapor to be adsorbed effectively in the canister. Thus, it is possible to improve the efficiency in adsorbing vapor.

According to a third aspect of the present invention, there is provided a vapor gas inhibiting device for a fuel tank comprising a control valve which is disposed in a communication passage by which a fuel tank communicates with a canister, a control device which performs open-close control of the control valve in accordance with a state of a vehicle, and flow rate detection means which detects a flow rate of vapor in the communication passage, wherein the control device controls the control valve such that a flow rate of vapor in the communication passage becomes equal to or smaller than a predetermined value, based on an output value of the flow rate detection means.

Thus, the control device controls the control valve such that the flow rate of vapor in the communication passage becomes equal to or smaller than a predetermined value, based on an output value of the flow rate detection means which detects a flow rate of vapor in the communication passage by which the fuel tank communicates with the canister. As a result, the speed at which vapor is discharged from the interior of the fuel tank can be limited to a value that enables vapor to be adsorbing effectively in the canister. Thus, it is possible to improve the efficiency in adsorbing vapor.

According to a fourth aspect of the present invention, there is provided a vapor gas inhibiting device for a fuel tank comprising a control valve which is disposed in a communication passage by which a fuel tank communicates with a canister, a control device which performs open-close control of the control valve in accordance with a state of a vehicle, and a temperature sensor which is disposed in the communication passage, wherein the control device controls the control valve based on a value detected by the temperature sensor.

Thus, the control device controls the control valve based on a value detected by the temperature sensor disposed in the communication passage by which the fuel tank communicates with the canister, whereby it becomes possible to ensure high efficiency in condensing and adsorbing vapor flowing through the communication passage in the canister.

In the aforementioned aspect of the present invention, cooling means may be provided in the communication passage, and the control device may be designed to control the control valve based on a value detected by the temperature sensor mounted to the cooling means such that sufficient cooling effect is obtained from the cooling means, and to restrict a flow rate of vapor to a predetermined value or less.

Thus, for example, immediately after the start of the cooling operation by means of the cooling means, the cooling means has not been cooled completely. Therefore, a sufficient cooling effect cannot be achieved. Thus, until the temperature detected by the temperature sensor becomes equal to or lower than a predetermined temperature, that is, until a sufficient cooling effect is achieved by the cooling means, the control device controls the control valve and restricts a vapor flow rate to a predetermined value or less so that predetermined cooling effect is achieved.

According to a fifth aspect of the present invention, there is provided a vapor gas inhibiting device for a fuel tank comprising a control valve which is disposed in a communication passage by which a fuel tank communicates with a canister, a control device which performs open-close control of the control valve in accordance with a state of a vehicle, pressure detection means which detects an internal pressure of the fuel tank, and storage means which stores a target internal pressure of the fuel tank, wherein the control device controls the control valve such that the interior of the fuel tank assumes the target internal pressure within a predetermined period, based on a difference between an internal pressure of the fuel tank upon the opening of the control valve and the target internal pressure.

Thus, the control device controls the control valve such that the interior of the fuel tank reaches a target internal pressure within a predetermined period, based on a difference between the internal pressure of the fuel tank upon the opening of the control valve and the target internal pressure stored in the storage means. As a result, it is possible to improve the efficiency in adsorbing vapor and bring the interior of the fuel tank to the target internal pressure within a predetermined period.

In the aforementioned aspect of the present invention, the predetermined period may be a period from operation of opening the lid to operation of opening the cap while refueling.

Thus, the internal pressure of the fuel tank can be shifted to the target internal pressure within the period from operation of opening the lid to operation of opening the cap while refueling. Therefore, it is possible to reduce the amount of vapor discharge out of the fuel filler neck.

According to a sixth aspect of the present invention, there is provided a vapor gas inhibiting device for a fuel tank comprising a control valve which is provided in a passage by which a fuel tank communicates with a vapor gas collecting device and which is opened during refueling operation, wherein the control valve is composed of a refueling valve and a pressure relief valve which are disposed in parallel and wherein the pressure relief valve is smaller in diameter than the refueling valve.

Thus, the large-diameter refueling valve and the pressure relief valve are selectively opened or closed, whereby it becomes possible to perform flow rate control in the control valve with ease.

In the aforementioned aspect of the present invention, the diameter of the refueling valve may be set such that a flow rate of vapor gas flowing through the refueling valve can be set to a flow rate enabling pressure relief of the fuel tank to be completed within a predetermined period.

Thus, the pressure relief of the fuel tank can be completed within the predetermined period by the opening of the refueling valve.

In the aforementioned aspect of the present invention, the diameter of the pressure release valve may be set such that a flow rate of vapor gas flowing through the pressure release valve is restricted to a flow rate enabling the vapor gas to be adsorbed in the vapor gas collecting device.

Thus, if the pressure relief valve has been opened, the diameter of the pressure relief valve restricts the flow rate of vapor gas passable through the pressure release valve to a flow rate enabling the vapor gas to be adsorbed in the vapor gas collecting device. As a result, the vapor collecting device can reliably adsorb hydrocarbon contained in vapor gas.

In the aforementioned aspect of the present invention, the refueling valve may be opened after the pressure relief valve has been opened.

Thus, if the internal pressure of the fuel tank in opening the control valve is high, vapor gas is caused to flow from the side of the fuel tank to the side of the vapor gas collecting device through the pressure release valve which is relatively small in diameter. Therefore, the vapor gas collecting device can reliably adsorb hydrocarbon contained in vapor gas. Further, after the pressure relief valve has been opened and the internal pressure of the fuel tank has dropped, the refueling valve, which is relatively large in diameter, is opened. Therefore, the opening force of the refueling valve can be reduced. After the pressure release valve has been opened, the refueling valve, which is relatively large in diameter, is opened so that vapor gas flows from the side of the fuel tank to the vapor gas collecting device. Therefore, the period required to relief a pressure in the fuel tank (the period required for vapor gas to flow from the side of the fuel tank to the side of the vapor gas collecting device) can be reduced.

In the aforementioned aspect of the present invention, the refueling valve may be closed in a running state of the vehicle.

Thus, by keeping the refueling valve closed in a running state of the vehicle, it becomes possible to inhibit a more than necessary amount of vapor gas from flowing from the side of the fuel tank to the side of the vapor gas collecting device.

According to a seventh aspect of the present invention, there is provided a vapor gas inhibiting device for a fuel tank comprising a control valve which is opened during refueling operation and which is provided in a passage by which a fuel tank communicates with a vapor gas collecting device, a communication device by which the fuel tank communicates with the vapor gas collecting device when driving an engine, and engine start means which starts the engine unless the control valve is opened during refueling operation.

Thus, if the control valve is not opened during refueling operation, and if the internal pressure of the fuel tank has not been lowered, the engine start means starts the engine. As a result, the fuel tank communicates with the vapor gas collecting device by the communication device. Therefore, even if the control valve is not opened during refueling operation, vapor fuel gas in the fuel tank can be fed to the vapor gas collecting device. Consequently, it becomes possible to lower the internal pressure of the fuel tank.

In the aforementioned aspect of the present invention, the control valve may be an solenoid valve, and the communication device may have a passage bypassing the solenoid valve and a diaphragm valve provided in the passage, and a negative pressure chamber of the diaphragm valve may communicate with a portion downstream of the solenoid valve.

Thus, if the solenoid valve is not opened during refueling operation, and if the internal pressure of the fuel tank has not been lowered, the engine start means starts the engine. As a result, the diaphragm valve can be opened by an intake negative pressure of the engine, so that the fuel tank comes into communication with the vapor gas collecting device.

Thus, even if the solenoid valve is not opened during refueling operation, vapor fuel gas in the fuel tank can be fed to the vapor gas collecting device. Consequently, it becomes possible to lower the internal pressure of the fuel tank.

In the aforementioned aspect of the present invention, the engine start means may be designed to start the engine only if it is confirmed that the vehicle has been braked.

Thus, the engine is startn only if it is confirmed that the vehicle has been braked. Consequently, it becomes possible to improve safety.

DETAILED DESCRIPTION OF PREFERRED EMBODIMENTS

A fuel tank system in accordance with a first embodiment of the present invention will be described with reference to FIG. 1.

Figure 1:
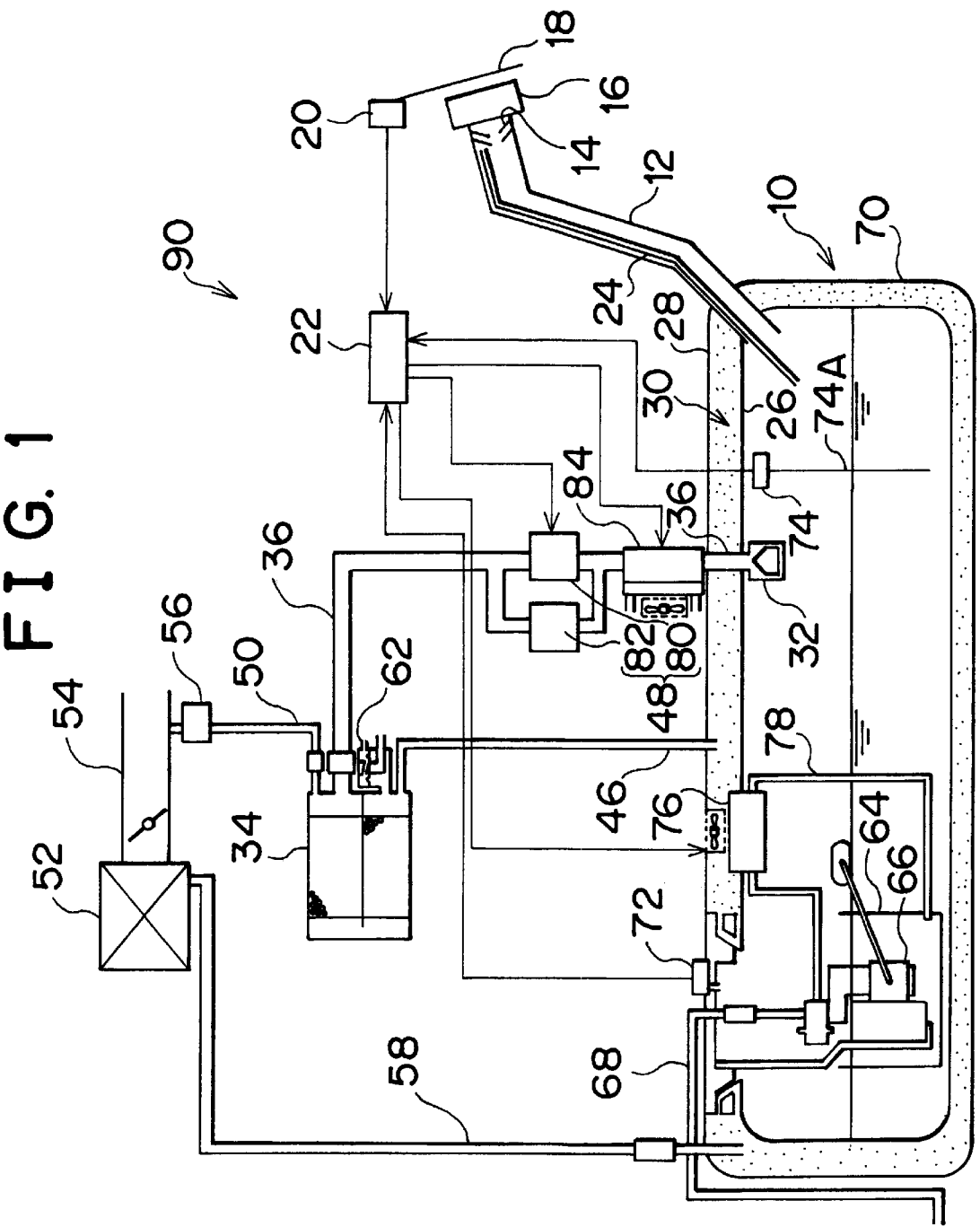
FIG. 1 is a schematic lateral cross-sectional view of a fuel tank system in accordance with a first embodiment of the present invention.

As shown in FIG. 1, in a fuel tank system 90 of this embodiment, one end of an inlet pipe (a fuel filling pipe) 12 penetrates a lateral wall portion of a fuel tank 10. The end of the inlet pipe 12 is inserted into the fuel tank 10. The other end of the inlet pipe 12 reaches a fuel filler opening 14 provided in a lateral wall portion of a vehicle.

A fuel filler cap 16 is mounted to the fuel filler opening 14. In refueling, a refueling gun (not shown) can be inserted by opening a fuel lid 18 and removing the fuel filler cap 16. In refueling, if a fuel level in the inlet pipe 12 rises and a sensor attached to the refueling gun detects a filled-up state, refueling operation by the refueling gun is automatically stopped. The fuel lid 18 is equipped with an open-close detection switch 20 for detecting an open or closed state of the fuel lid 18. The open-close detection switch 20 is connected to a control circuit 22. A vent pipe 24 is disposed in the inlet pipe 12.

The fuel tank 10 of this embodiment is of a double-layer tank structure composed of an inner tank shell 26 which accommodates fuel and an outer tank shell 28 which is disposed outside the inner tank shell 26. An inter-tank-shell space 30 is formed between the inner tank shell 26 and the outer tank shell 28. The inner tank shell 26 can be made from a material generally used for a fuel tank, such as a metal, a resin and the like. The inner tank shell 26 has an increased thickness in comparison with a generally employed fuel tank and thus is improved in pressure resistance.

A heat insulation material 70 is disposed on an inner surface of the outer tank shell 28. The heat insulation material 70 makes it difficult to transmit heat outside the fuel tank 10 to the inter-tank-shell space 30. To enhance heat insulation effect, it is preferable to provide the heat insulation material 70 on the entire surface of the fuel tank 10. However, as long as required and sufficient heat insulation effect can be achieved, it is also possible to provide the heat insulation material 70 only on a part of the fuel tank 10. Although the heat insulation material 70 is not limited to any specific substance, it is preferable to use, for example, a porous material such as a foamed resin and a sponge material for reasons of improved heat insulation effect.

As shown in FIG. 1, a known float valve 32 for detecting a filled-up state and preventing roll over is disposed in an upper wall portion of the inner tank shell 26 of the fuel tank 10. An evaporation passage 36 leading to a canister 34 is connected to the float valve 32. The inter-tank-shell space 30 communicates with the canister 34 by a purge line 46. The canister 34 is purged by air in the inter-tank-shell space 30.

The canister 34 communicates with a surge tank 54 by a purge line 50. The surge tank 54 communicates with an air cleaner 52. A purge control valve (a vacuum switching valve) 56 is disposed in an intermediate portion of the purge line 50. This makes it possible to draw air in the inter-tank-shell space 30 into the canister 34, for example, by utilizing a negative pressure generated by the opening or closing of a throttle valve. A breather valve 62 is disposed in the canister 34.

On the other hand, the air cleaner 52 communicates with the inter-tank-shell space 30 through an intake pipe 58. If the pressure in the inter-tank-shell space 30 becomes negative, the air that has been purified by the air cleaner 52 flows into the inter-tank-shell space 30 through the intake pipe 58.

A pressure sensor 72 and a temperature sensor 74 are mounted to an upper wall of the fuel tank 10. The pressure sensor 72 and the temperature sensor 74 are connected to a control circuit 22. The pressure sensor 72 and the temperature sensor 74 detect a pressure and a fuel temperature in the fuel tank 10 respectively, and send detected results to the control circuit 22. The temperature sensor 74 has a detection element 74A extending to the vicinity of a bottom portion of the inner tank shell 26. Therefore, even when there is only a small amount of fuel, the temperature sensor 74 can detect a fuel temperature.

A subtank 64 is disposed inside the inner tank shell 26. A pump unit 66 is disposed inside the subtank 64. A fuel feed pipe 68 leading to an engine is coupled to the pump unit 66. Similarly, a Peltier unit 76 is mounted to the upper wall of the fuel tank 10. Also, there is provided a circulation line 78 wherein the pump unit 66 causes fuel to circulate from the subtank 64 to the Peltier unit 76 and back into the subtank 64.

The Peltier unit 76 is connected to the control circuit 22. The control circuit 22 stores a fuel temperature (an initial temperature) in the fuel tank 10 measured by the temperature sensor 74, for example, during start of the vehicle, and controls the Peltier unit 76 such that the fuel temperature during a running state of the vehicle is maintained at the initial temperature. In addition, the control circuit 22 is also capable of controlling the Peltier unit 76 such that the pressure in the fuel tank 10 detected by a pressure sensor 72 becomes smaller than a predetermined pressure (a control pressure).

A valve member 48 is disposed in an intermediate portion of the evaporation passage 36 extending from the float valve 32 to the canister 34. The valve member 48 is composed of a control valve 80 and a vent valve 82. The evaporation passage 36 is partially bifurcated. The control valve 80 is provided in one of the bifurcated passages, and the vent valve 82 is provided in the other bifurcated passage.

The control valve 80 is connected to the control circuit 22. In refueling, that is, in the case where the open-close detection switch 20 has detected an open state of the fuel lid 18 (a refueling state), in the case where the pressure detected by the pressure sensor 72 during a running state of the vehicle has become higher than a predetermined pressure (a running-state relief pressure, a minimum open-valve pressure) (a high-pressure state), and in the case where the fuel temperature in the tank 10 detected by the temperature sensor 74 has become higher than a predetermined temperature (a high-temperature state), the control circuit 22 opens the control valve 80. Furthermore, while the vehicle is parked, the control circuit 22 keeps the control valve 80 closed.

The vent valve 82 is not connected to the control circuit 22. That is, the vent valve 82 is opened at a predetermined open-valve pressure (a parked-state relief pressure) independently of the control valve 80. The aforementioned control pressure is set to a pressure within the range of the running-state relief pressure on both positive and negative sides. The running-state relief pressure is also set to a pressure within the range of the parked-state relief pressure on both positive and negative pressures. Furthermore, the parked-state relief pressure is set higher than a pressure in the fuel tank 10 that is predicted from a daytime maximum temperature and the like.

A Peltier unit 84 is mounted to the evaporation passage 36 between the float valve 32 and the valve member 48. The Peltier unit 84 is connected to the control unit 22. In response to an opening movement of the control valve 80, the control circuit 22 controls the Peltier unit 84.

Next, operation of this embodiment will be described. For convenience of explanation, the following description will be made as to the operation (1) during refueling operation, (2) in a running state of the vehicle, and (3) in a parked state of the vehicle.

(1) During Refueling Operation

If the open-close detection switch 20 detects that the fuel lid 18 has been opened, the control circuit 22 judges that refueling operation has been started or that refueling operation is being performed (judgment of refueling operation) and then activates the Peltier unit 84. In response thereto, the control circuit 22 opens the control valve 80.

By thus activating the Peltier unit 84 during refueling operation, part of the vapor that has been generated in the fuel tank 10 during refueling operation is cooled and liquefied by the Peltier unit 84 and returned into the fuel tank 10. Therefore, the amount of vapor introduced into the canister 34 is reduced. That is, the amount of vapor adsorbed by the canister 34 can be restricted. As a result, it is possible to reduce the size of the canister 34 and the load of the canister 34 (the load for purge operation) and achieve high energy efficiency.

Further, since part of the vapor is condensed, the total amount of vapor discharged in the entire fuel tank 10 is reduced. This makes it possible to reduce the amount of emission substances.

The aforementioned refueling judgment need not always be carried out by means of the open-close detection switch 20. That is, since the fuel filler cap 16 is removed during refueling operation, the refueling judgment may be carried out by detecting removal of the fuel filler cap 16. Further, in a motor vehicle wherein the opening and closing of the fuel lid 18 can be controlled by an open-close switch provided in the cabin, the refueling judgment may be carried out based on a signal from the open-close switch.

(2) In a Running State of the Vehicle

In a running state of the vehicle, since the fuel filler cap 16 is closed, the fuel tank 10 is enclosed. However, the heat insulation material 70 is disposed on the entire inner surface of the outer tank shell 28, so that heat outside the fuel tank 10 is unlikely to be transmitted to the inter-tank-shell space 30. Hence, even if the temperature outside the fuel tank 10 has risen, the heat that has entered the fuel tank 10 from outside is insulated by the heat insulation material 70. In other words, fuel in the fuel tank 10 is prevented from rising in temperature due to the heat from outside (a rise in temperature). As a result, generation of vapor is inhibited.

Further, the control circuit 22 activates the Peltier unit 76 so that fuel circulating through the circulation line 78 (part of the fuel that is fed to the fuel feed pipe 68 by the pump unit 66) is cooled. Especially in the fuel tank system 90 of this embodiment, the control circuit 22 stores a fuel temperature (an initial temperature) in the fuel tank 10 measured by the temperature sensor 74, for example, during start of the vehicle, and controls the Peltier unit 76.such that the fuel temperature during a running state of the vehicle is maintained at the initial temperature. This inhibits a rise in temperature of fuel in the fuel tank 10. Thus, it is possible to inhibit vaporization of fuel, that is, generation of vapor. Even in the case where the Peltier unit 76 is thus activated, the heat insulation material 70 in the fuel tank 10 inhibits a rise in temperature resulting from heat from outside. Thus, the load of the Peltier unit 76 is reduced. As a result, it is possible to reduce the size of the Peltier unit 76 and achieve high energy efficiency in comparison with the case where such a heat insulation material 70 is not provided.

Further, the control circuit 22 is also able to control the Peltier unit 76 such that the pressure in the fuel tank 10 detected by the pressure sensor 72 becomes lower than a predetermined pressure (a control pressure). This also makes it possible to prevent discharge of vapor from the fuel tank 10.

Even in the case where the Peltier unit 76 has thus been controlled, it is predictable that the pressure in the fuel tank 10 exceed the aforementioned control pressure, for example, due to an abrupt rise in outside air temperature. If the pressure sensor 72 detects excess of the aforementioned control pressure, the control circuit 22 opens the control valve 80 and performs control such that the pressure in the fuel tank 10 becomes lower than a running-state relief pressure. This inhibits discharge of vapor from the fuel tank 10. Further, since the pressure applied to the fuel tank 10 (especially the inner tank shell 26) is lowered, the pressure resistance of the fuel tank 10 can be set to a small value.

Further, the control circuit 22 activates the Peltier unit 84 in response to the opening of the control valve 80. By thus activating the Peltier unit 84, part of the vapor that has been generated in the fuel tank 10 in a running state of the vehicle is cooled, condensed and returned to the fuel tank 10. Thus, the amount of vapor introduced into the canister 34 is reduced. That is, since the amount of vapor adsorbed by the canister 34 is restricted, it becomes possible to reduce the size and the purge load of the canister 34 and achieve high energy efficiency.

As long as generation of vapor from the fuel tank 10 can surely be inhibited by controlling a running-state relief pressure through the opening of the control valve 80, it is not always necessary to activate the Peltier unit 76.

(3) In a Parked State of the Vehicle

In a parked state of the vehicle, the control circuit 22 keeps the control valve 80 closed. Hence, the pressure in the fuel tank 10 is controlled depending on a parked-state relief pressure that has been set by the vent valve 82. In other words, if the pressure in the fuel tank 10 is lower than the parked-state relief pressure, the vent valve 82 is closed. However, if the pressure in the fuel tank 10 is higher than the parked-state relief pressure, the vent valve 82 is opened. This parked-state relief pressure is set higher than a running-state relief pressure controlled by the control valve 80. Therefore, it is possible to effectively prevent discharge of vapor from the fuel tank 10 in a parked state of the vehicle.

In addition, the pressure in the fuel tank 10 can be switched between the parked- state relief pressure and the running-state relief pressure merely by controlling the control valve 80. That is, there is no need to separately provide a switching device (a switching valve or the like). Therefore, the control or structure for switching the pressure in the fuel tank 10 does not become complicated.

Further, in a parked state of the vehicle, as in a running state of the vehicle, since the fuel filler cap 16 is also closed, the fuel tank 10 is enclosed. However, the heat that has entered the fuel.tank 10 from outside is insulated by the heat insulation material 70. That is, the temperature of fuel in the fuel tank 10 is prevented from rising in temperature due to heat from outside (a rise in temperature), and generation of vapor is inhibited.

In addition, the pressure in the fuel tank 10 is also inhibited from rising by thus a preventing the temperature in the fuel tank 10 from rising by means of the heat insulation material 70. Because the pressure applied to the fuel tank 10 (especially the inner tank shell 26) is reduced, the pressure resistance of-the fuel tank 10 can be set to a small value. The set pressure of the vent valve 82 (the parked-state relief pressure) can also be set to a small value.

As has been described hitherto, in the fuel tank system 90 of this embodiment, both during refueling operation and in a running state of the vehicle, generation of vapor can efficiently be inhibited in accordance with the performance of the Peltier units 76, 84 (cooling means), and the canister can be reduced in size.

The type of the motor vehicle in which the fuel tank system 90 of this embodiment is installed is not specifically limited. However, it is preferable to install the fuel tank system 90, for example, in a motor vehicle equipped with an engine having an intake pipe whose negative pressure is low. That is, in general, in an engine of a motor vehicle, vapor adsorbed by the canister 34 is fed to the engine by utilizing a negative pressure generated, for example, by opening or closing a throttle valve. However, in an engine having an intake pipe whose negative pressure is low, if the capacity of the canister is increased, it becomes difficult to feed vapor from the canister to the engine. On the other hand, in the fuel tank system 90 of this embodiment, the canister 34 can be reduced in size (reduced in capacity). Therefore, the fuel tank system 90 can also be installed in a motor vehicle equipped with an engine having an intake pipe whose negative pressure is low, without causing any inconveniences.

The aforementioned description handles an example wherein the fuel tank 10 is of a double-layer structure composed of the inner tank shell 26 and the outer tank shell 28. However, as long as the heat insulation material 70 is provided to insulate the heat that has entered from outside, the fuel tank 10 need not be of a double-layer tank structure. For example, the heat insulation material 70 may be mounted to the outside of the inner tank shell 26.

Further, as long as fuel can be cooled, the cooling means of the present invention is not limited to the aforementioned Peltier units 76, 84. However, it is preferable to employ Peltier units in view of their high cooling efficiency and reduced size.

As long as the control valve of the present invention is controlled (opened and closed) by the control circuit, the concrete structure thereof is not limited. For example, it is possible to use an electromagnetic valve, a motor-operated valve and the like. By the same token, as long as the vent valve of the present invention is designed to be opened at a higher open-valve pressure than a minimum open-valve pressure of the control valve without being controlled by the control device, the concrete structure thereof is not specifically limited. For example, it is possible to use a diaphragm valve and the like.

A vapor gas inhibiting device of a fuel tank in accordance with a second embodiment of the present invention will be described with reference to FIG. 2.

In this embodiment, components identical to those of the first embodiment will be denoted by the same reference numerals and the description thereof will be omitted.

Figure 2:
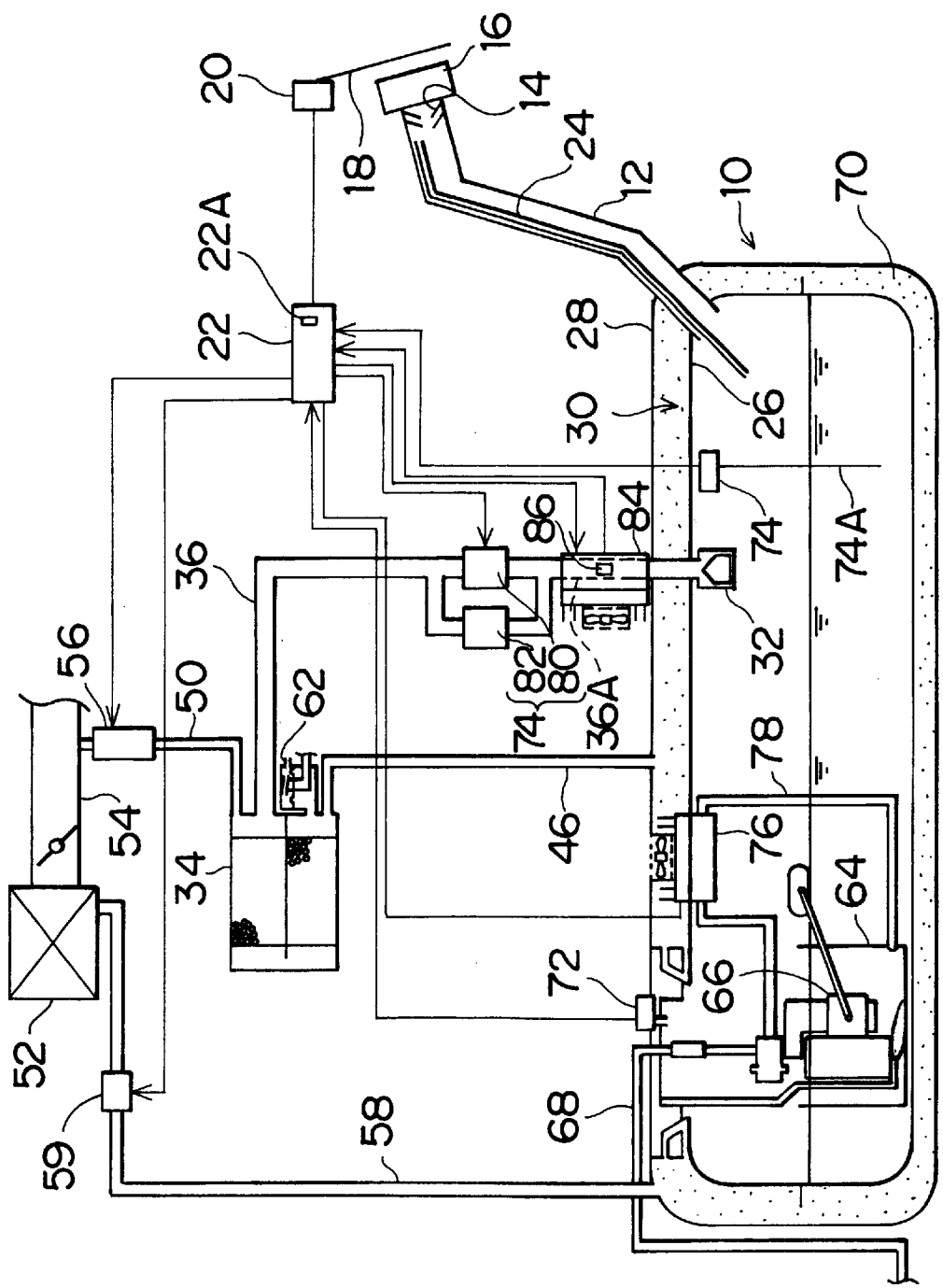
FIG. 2 is a structural view of a vapor gas inhibiting device of a fuel tank in accordance with a second embodiment of the present invention.

As shown in FIG. 2, in the vapor gas inhibiting device of the fuel tank of this embodiment, a ROM 22A designed as storage means is disposed in the control device 22. A target internal pressure of the fuel tank 10 in an open state of the lid, a target relief pressure in a running state of the vehicle, a predicted period from the opening of the lid to the opening of the cap during refueling operation, a predicted period from start of the vehicle to the start of purge opersolenoidion, and the like are stored in the ROM 22A in advance.

In this embodiment, a close valve 59 is disposed in an intermediate portion of the intake pipe 58.

A temperature sensor 86 for detecting a temperature of vapor is disposed in an evaporation passage 36A at a position where the Peltier unit 84 is disposed. The temperature sensor 86 is connected to the control device 22. The temperature sensor 86 detects a temperature in the evaporation passage 36A in the position where the Peltier unit 84 is disposed, and sends a detected value (data) to the control device 22.

Next, operation of this embodiment will be described.

For convenience of explanation, the following description will be made as to the operation (1) during refueling operation, (2) in a running state of the vehicle, and (3) in a parked state of the vehicle.

(1) During Refueling Operation

If the open-close detection switch 20 detects that the fuel lid 18 has been opened (in an open state of the lid), the control device 22 controls the control valve 80 such that the internal pressure of the fuel tank 10 reaches a target internal pressure within a predetermined period, more specifically, within a predicted period which starts with the opening of the lid during refueling operation and ends with the opening of the cap and which is stored in the ROM 22A in advance, based on a difference between an initial internal pressure of the fuel tank 10 upon the opening of the control valve 80 and a target internal pressure upon the opening of the lid (e.g. an atmospheric pressure) which is stored in the ROM 22A of the control device 22. As a result, for example, if the lid has been opened and if the internal pressure of the fuel tank 10 has not reached the target internal pressure upon the opening of the lid, the internal pressure of the fuel tank 10 can be shifted to the target internal pressure within a period from the opening of the lid during refueling operation to the opening of the cap. Thus, it is possible to reduce an amount of vapor leaking out of the fuel filler opening.

Further, if the open-close detection switch 20 detects that the fuel lid 18 has been opened, the control device 22 judges that refueling operation has been started or that refueling operation is being performed (judgment of refueling operation) and then activates the Peltier unit 84. In response thereto, the control device 22 opens the control valve 80.

In this embodiment, immediately after the start of cooling operation (for a while after the Peltier unit 84 has been turned on), the Peltier unit 84 has not been cooled completely. Therefore, sufficient cooling effect cannot be achieved. Thus, until the temperature detected by the temperature sensor 86 (the temperature of vapor that has been cooled by the Peltier unit 84) becomes equal to or lower than a predetermined temperature, that is, until sufficient cooling effect is achieved by the Peltier unit 84, the control device 22 performs duty control of an open period of the control valve 80 and restricts a vapor flow rate to a predetermined value or less so that predetermined cooling effect is achieved. As a result, even if the Peltier unit 84 has not been cooled completely immediately after the start of cooling operation, the temperature of vapor flowing through the evaporation passage 36 can be lowered reliably by means of the Peltier unit 84. Therefore, it is possible to ensure high efficiency in condensing and adsorbing vapor.

By thus activating the Peltier unit 84 during refueling operation, part of the vapor that has been generated in the fuel tank 10 during refueling operation is cooled and condensed by the Peltier unit 84 and returned to the fuel tank 10. Thus, the amount of vapor introduced into the canister 34 is reduced. That is, the amount of vapor to be adsorbed by the canister 34 can be reduced. This makes it possible to reduce the size of the canister 34 and the load of the canister 34 (the load for purge operation). Further, since part of the vapor is condensed, the total amount of vapor discharged in the entire fuel tank 10 is reduced. This makes it possible to reduce the amount of emission substances.

The aforementioned refueling judgment need not always be carried out by means of the open-close detection switch 20. For example, in a motor vehicle wherein the opening and closing of the fuel lid 18 can be controlled by an open-close switch provided in the cabin, the refueling judgment may be carried out based on a signal from the open-close switch.

(2) In a Running State of the Vehicle

In a running state of the vehicle, since the refueling cap 16 is closed, the fuel tank 10 is enclosed. However, the heat insulation material 70 is disposed on the entire inner surface of the outer tank shell 28, so that heat outside the fuel tank 10 is unlikely to be transmitted to the inter-tank-shell space 30. Hence, even if the temperature outside the fuel tank 10 has risen, the heat that has entered the fuel tank 10 from outside is insulated by the heat insulation material 70. In other words, fuel in the fuel tank 10 is inhibited from rising in temperature due to the heat from outside (a rise in temperature). As a result, generation of vapor is inhibited.

Further, the control device 22 activates the Peltier unit 76 so that fuel circulating through the circulation line 78 (part of the fuel that is fed to the fuel feed pipe 68 by the pump unit 66) is cooled. Especially in this embodiment, the control device 22 stores a fuel temperature (an initial temperature) in the fuel tank 10 measured by the temperature sensor 74, for example, during start of the vehicle, and controls the Peltier unit 76 such that the fuel temperature during a running state of the vehicle is maintained at the initial temperature. This inhibits a rise in temperature of fuel in the fuel tank 10. Thus, it is possible to inhibit vaporization of fuel, that is, generation of vapor. Even in the case where the Peltier unit 76 is thus activated, the heat insulation material 70 in the fuel tank 10 inhibits a rise in temperature resulting from heat from outside. Thus, the load of the Peltier unit 76 is reduced. As a result, it is possible to reduce the size of the Peltier unit 76 and achieve high energy efficiency in comparison with the case where such a heat insulation material 70 is not provided.

Further, the control device 22 is also able to control the Peltier unit 76 such that the internal pressure of the fuel tank 10 detected by the pressure sensor 62 becomes lower than a predetermined pressure (a control pressure). This also makes it possible to prevent discharge of vapor from the fuel tank 10.

Even in the case where the Peltier unit 76 has thus been controlled, it is predictable that the pressure in the fuel tank 10 exceeds the aforementioned control pressure, for example, due to an abrupt rise in outside air temperature. If the pressure sensor 72 detects pressure in excess of the aforementioned control pressure, the control device 22 opens the control valve 80 and performs control such that the internal pressure of the fuel tank 10 becomes lower than a running-state relief pressure.

In this case, the control device 22 calculates a change in internal pressure of the fuel tank 10 based on a pressure detected by the pressure sensor 72, and controls the control valve 80 such that the change in internal pressure remains equal to or smaller than a predetermined value. To be more specific, the control device 22 performs duty control of an open period of the control valve 80 and restricts an amount of vapor flowing through the control valve 80 per unit time (a vapor flow rate) to a predetermined value or less. As a result, the speed at which vapor is discharged from the interior of the fuel tank 10 to the canister 34 can be limited to a value that enables vapor to be adsorbed effectively in the canister 34. Thus, it is possible to efficiently adsorb vapor in the canister 34 and improve the efficiency in adsorbing vapor.

Further, the control device 22 activates the Peltier unit 84 in response to the opening of the control valve 80. By thus activating the Peltier unit 84, part of the vapor that has been generated in the fuel tank 10 in a running state of the vehicle is cooled, condensed and returned to the fuel tank 10. Thus, the amount of vapor introduced into the canister 34 is reduced. That is, since the amount of vapor to be adsorbed by the canister 34 can be reduced, it becomes possible to reduce the size and the load of the canister 34 (the load for purge operation). Further, since part of the vapor is condensed, the total amount of vapor discharged in the entire fuel tank 10 is reduced. This makes it possible to reduce the amount of emission substances.

Further, in this embodiment, immediately after the start of the cooling operation (for a while after the Peltier unit 84 has been turned on), the Peltier unit 84 has not been cooled completely. Therefore, sufficient cooling effect cannot be achieved. Thus, until the temperature detected by the temperature sensor 86 (the temperature of vapor that has been cooled by the Peltier unit 84) becomes equal to or lower than a predetermined temperature, that is, until a sufficient cooling effect is achieved by the Peltier unit 84, the control device 22 performs duty control of an open period of the control valve 80 and restricts a vapor flow rate to a predetermined value or less so that predetermined cooling effect is achieved. As a result, even if the Peltier unit 84 has not been cooled completely immediately after the start of cooling operation, the temperature of vapor flowing through the evaporation passage 36 can be lowered reliably by means of the Peltier unit 84. Therefore, it is possible to ensure high efficiency in condensing and adsorbing vapor.

(3) In a Parked State of the Vehicle

In a parked state of the vehicle, the control device 22 keeps the control valve 80 closed. Hence, the internal pressure of the fuel tank 10 is controlled depending on a parked-state relief pressure that has been set by the vent valve 82. In other words, if the internal pressure of the fuel tank 10 is lower than the parked-state relief pressure, the vent valve 82 is closed. However, if the internal pressure of the fuel tank 10 is higher than the parked-state relief pressure, the vent valve 82 is opened. This parked-state relief pressure is set higher than a running-state relief pressure controlled by the control valve 80. Therefore, it is possible to effectively prevent discharge of vapor from the fuel tank 10 in a parked state of the vehicle.

In addition, the internal pressure of the fuel tank 10 can be switched between the parked-state relief pressure and the running-state relief pressure merely by controlling the control valve 80. That is, there is no need to separately provide a switching device (a switching valve or the like). Therefore, the control or structure for switching the pressure in the fuel tank 10 does not become complicated.

As has been described hitherto, in the vapor gas inhibiting device of the fuel tank of this embodiment, both during refueling operation and in a running state of the vehicle, it is possible to efficiently adsorb vapor in the canister 34 and enhance the efficiency in condensing vapor. Thus, the efficiency in adsorbing vapor can be enhanced.

Figure 3:
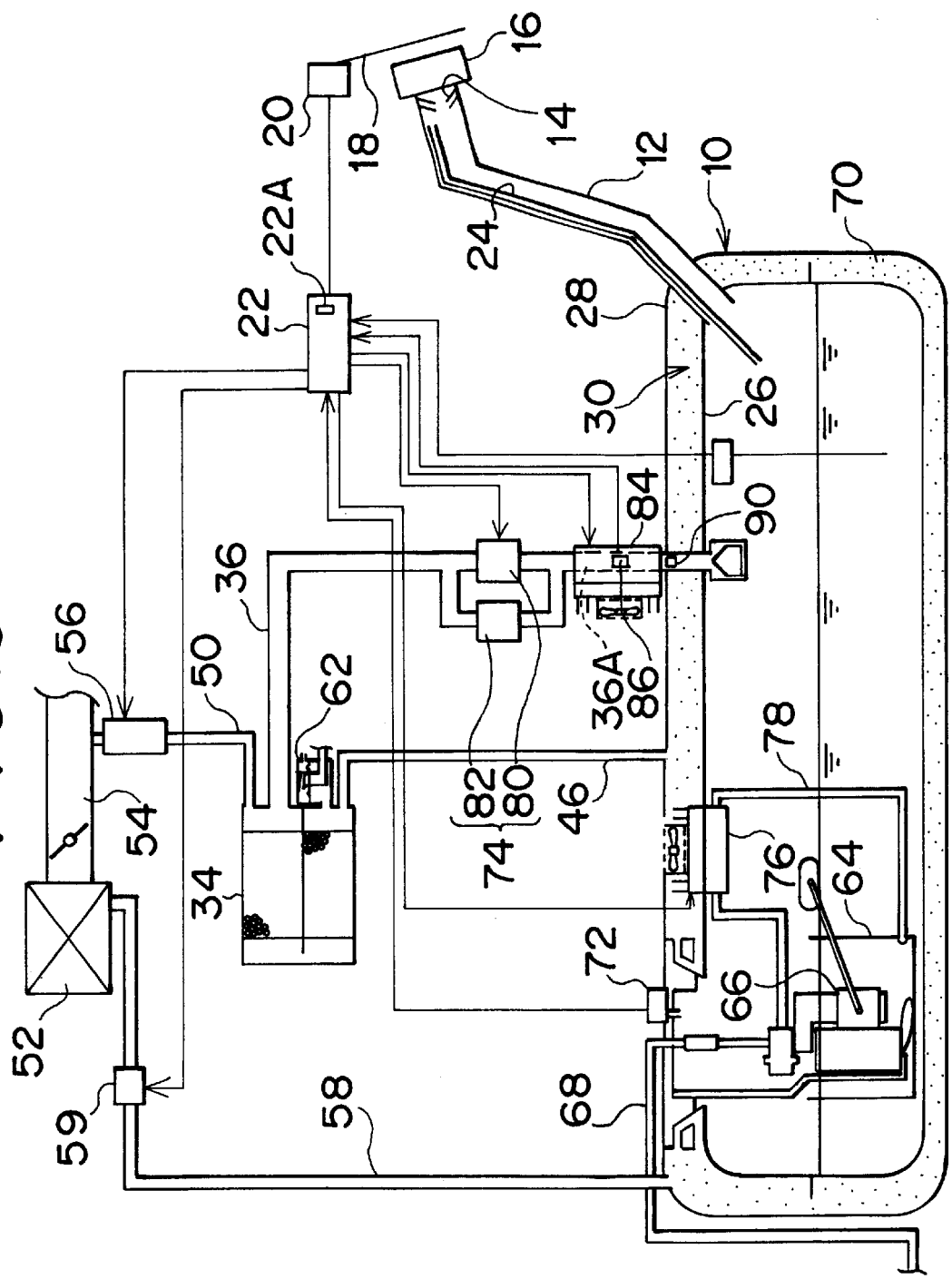
FIG. 3 is a structural view of a vapor gas inhibiting device of a fuel tank in accordance with a third embodiment of the present invention.

In a third embodiment of the present invention shown in FIG. 3, it is possible to employ a construction wherein a flow rate sensor 90 designed as flow rate detection means for directly detecting a vapor flow rate is disposed in the evaporation passage 36 and wherein the control device 22 controls the control valve 80 such that the vapor flow rate in the evaporation passage 36 becomes equal to or smaller than a predetermined value, based on an output value of the flow rate sensor 90. That is, in the second embodiment shown in FIG. 2, a change in internal pressure of the fuel tank 10 is calculated based on a pressure detected by the pressure sensor 72, and the flow rate of vapor flowing through the control valve 80 is restricted to a predetermined value or less based on the change in internal pressure. Instead, however, it is also possible to employ a construction wherein the flow rate of vapor flowing through the control valve 80 is restricted to a predetermined value or less based on a value detected by the flow rate sensor 90.

The type of the motor vehicle in which the vapor gas inhibiting device of the fuel tank of this embodiment is installed is not specifically limited. However, it is preferable to install the vapor gas inhibiting device, for example, in a motor vehicle equipped with an engine having an intake pipe whose negative pressure is low. That is, in general, in an engine of a motor vehicle, vapor adsorbed by the canister 34 is fed to the engine by utilizing a negative pressure in an intake pipe. However, in an engine having an intake pipe whose negative pressure is low, if the capacity of the canister is increased, it becomes difficult to feed vapor from the canister to the engine. On the other hand, in this embodiment, the canister 34 can be reduced in size (reduced in capacity). Therefore, the-vapor gas inhibiting device can also be installed in a motor vehicle equipped with an engine having an intake pipe whose negative pressure is low, without causing any inconveniences.

Further, the cooling means of the present invention is not limited to the aforementioned Peltier units 76, 84. However, it is preferable to employ Peltier units in view of their high cooling efficiency and reduced size.

As long as the control valve of the present invention is controlled (opened and closed) by the control circuit, the specific structure thereof is not limited. For example, it is possible to use an electromagnetic valve, a motor-operated valve and the like. By the same token, as long as the vent valve of the present invention is designed to be opened at a higher open-valve pressure than a minimum open-valve pressure of the control valve without being controlled by the control device, the specific structure thereof is not limited. For example, it is possible to use a diaphragm valve and the like.

A vapor gas inhibiting device of a fuel tank in accordance with a fourth embodiment of the present invention will be described with reference to FIGS. 4, 5.

Figure 4:
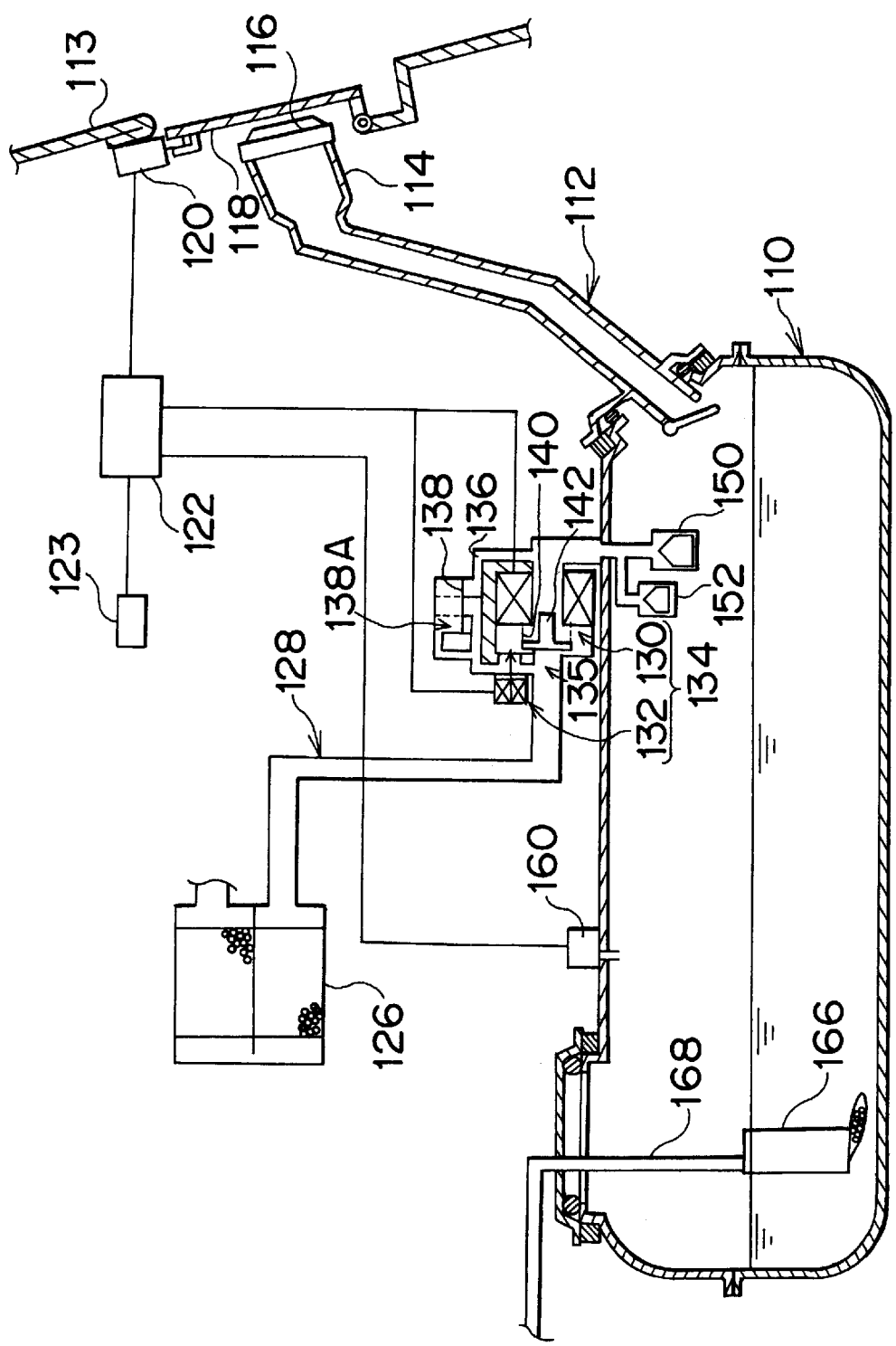
FIG. 4 is a structural view of a vapor gas inhibiting device of a fuel tank in accordance with a fourth embodiment of the present invention.

As shown in FIG. 4, in the vapor gas inhibiting device of the fuel tank of this embodiment, one end of an inlet pipe (a fuel filling pipe) 112 penetrates a lateral wall portion of a fuel tank 110. The end of the inlet pipe 112 is inserted into the fuel tank 110. The other end of the inlet pipe 112 reaches a fuel filler opening 114 provided in a vehicle lateral wall portion 113.

A fuel filler cap 116 is mounted to the fuel filler opening 114. In refueling, a refueling gun (not shown) can be inserted by opening a fuel lid 118 and removing the fuel filler cap 116. In refueling, if a fuel level in the inlet pipe 112 rises and a sensor attached to the refueling gun detects a filled-up state, refueling operation by the refueling gun is automatically stopped (auto-stop). The vehicle lateral wall portion 113 is equipped with a. fuel lid open-close device 120 which automatically opens the fuel lid 118 and which maintains the fuel lid 118 at its closed position. For example, the fuel lid open-close device 120 is composed of a solenoid, a motor and the like and connected to a control device (an ECU) 122. The control device 122 is connected to a fuel lid open-close operation switch 123 disposed in a cabin. If a passenger turns the fuel lid open-close operation switch 123 on, an opening signal is thereby sent from the control device 122 to the fuel lid open-close operation switch 123, and the fuel lid 118 is opened.

In a fuel-tank-side portion of a breather line 128 designed as a passage connecting the fuel tank 110 with a canister 126, a large-diameter refueling valve 130 and a small-diameter pressure relief valve 132 are disposed in parallel. The refueling valve 130 and the pressure relief valve 132 constitute a control valve 134.

Figure 5:
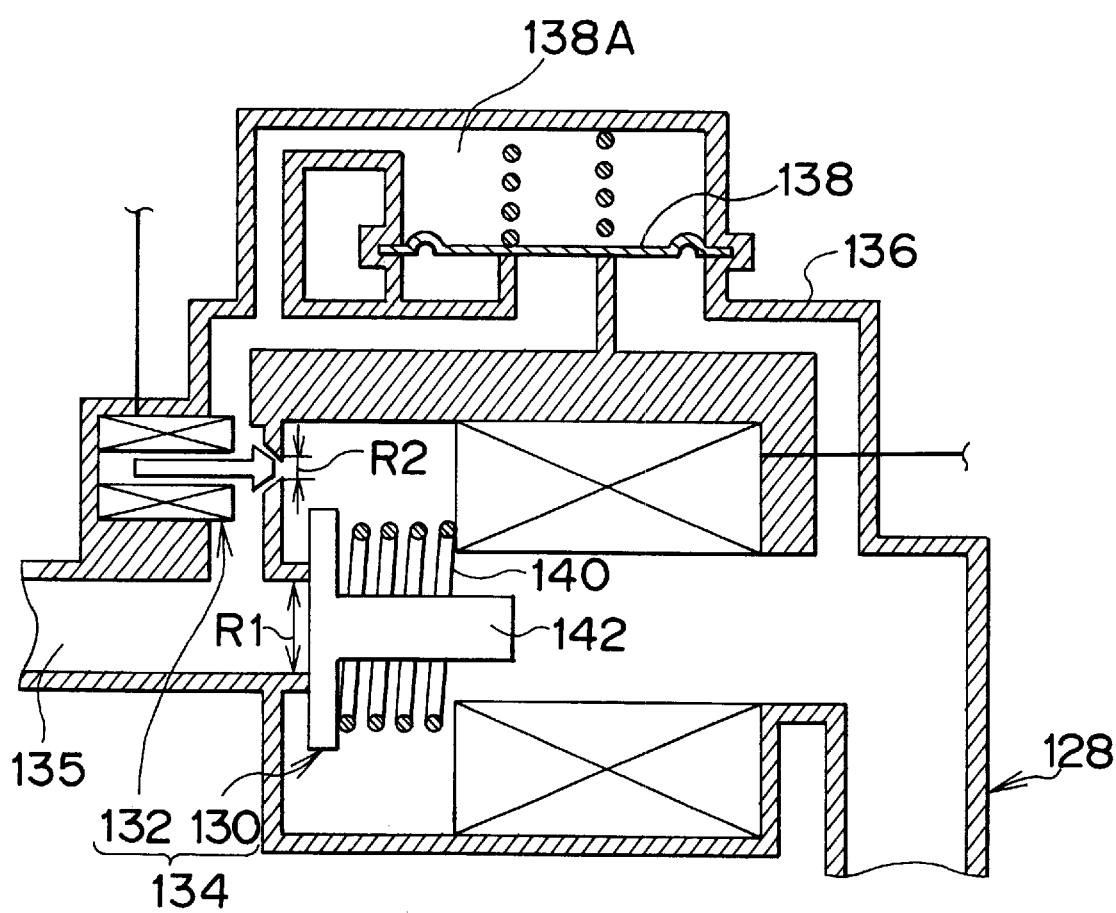
FIG. 5 is an enlarged cross-sectional view of a control valve in the vapor gas inhibiting device of the fuel tank in accordance with the fourth embodiment of the present invention.

As shown in FIG. 5, the diameter R1 of the refueling valve 130 is set to a value wherein the flow rate of vapor gas flowing through the refueling valve 130 makes it possible to complete pressure relief of the fuel tank 110 within a predetermined period. If the refueling valve 130 has been opened during refueling operation, refueling operation is prevented from being hampered by a ventilation resistance of vapor gas flowing from the side of the fuel tank to the side of the canister. Further, the diameter R2 of the pressure relief valve 132 is set to a value wherein the flow rate of vapor gas flowing through the pressure relief valve 132 is limited to a flow rate enabling adsorption of the vapor gas in the canister 126. If only the pressure relief valve 132 has been opened, the diameter of the pressure relief valve 132 limits the flow rate of vapor gas passable through the pressure relief valve 132 to a flow rate enabling adsorption of the vapor gas in the canister 126.

The refueling valve 130 and the pressure release valve 132 are constructed of solenoid valves which are controlled by the control device 122 to be opened or closed. Even when the refueling valve 130 is closed, if the pressure relief valve 132 is opened, the breather line 128 comes into communication. When the refueling valve 130 is off (not supplied with electric current), a valve body 142 keeps the breather line 128 closed by means of a spring 140 which is built into the refueling valve 130. By the same token, when the pressure relief valve 132 is off (not supplied with electric current), a valve body keeps the breather line 128 closed by means of urging means (not shown) which is built into the pressure relief valve 132.

The control device 122 opens the pressure relief valve 132. After the internal pressure of the fuel tank 110 has dropped, the control device 122 opens the refueling valve 130. Further, in a running state of the vehicle, the control device 122 closes the refueling valve 130 and the pressure relief valve 132, for example, if a vehicle speed sensor has detected a vehicle speed which is equal to or higher than a predetermined speed.

Further, a vent valve 138 constructed of a diaphragm valve is provided in a passage bypassing the control valve 134. The vent valve 138 communicates on the side of a negative pressure chamber 138A with the control valve 134 on the side of a canister 135.

A float valve 150 and a cut-off valve 152 are disposed in parallel in an opening portion of the breather line 128 in the fuel tank. In a filled-up state, the float valve 150 assumes its closed position, whereas the cut-off valve 152 assumes its unclosed position.

Although not shown, the canister 126 communicates with a surge tank by a purge line. The surge tank communicates with an air cleaner. A purge control valve (a duty-vacuum switching valve) is disposed in an intermediate portion of the purge line. This makes it possible to purge the canister 126 by utilizing a negative pressure in the surge tank. Further, a breather valve (not shown) is disposed in the canister 126.

Further, a pressure sensor 160 for detecting an internal pressure of the fuel tank 110 is disposed in an upper wall of the fuel tank 110. The pressure sensor 160 detects an internal pressure of the fuel tank 110 and sends a detected value (data) to the control device 122. In addition, a pump unit 166 is disposed in the inner tank shell 126, and a fuel feed pipe 168 leading to the engine is coupled to the pump unit 166.

Next, operation of this embodiment will be described.

For convenience of explanation, the following description will be made as to the operation (1) in a parked state of the vehicle, (2) in a running state of the vehicle, and (3) during refueling operation.

(1) In a Parked State of the Vehicle

While the vehicle is parked, that is, if an ignition switch of the vehicle has been turned off, the control device 122 is turned off so that the refueling valve 130 and the pressure relief valve 132 are closed. However, if the internal pressure on the side of the a fuel tank has become higher than an internal pressure on the side of the canister by a predetermined value or more, the vent valve 138 is opened due to the difference in pressure. That is, if the internal pressure of the fuel tank 10 is lower than a predetermined pressure, the vent valve 138 is closed. Otherwise, the vent valve 138 is opened. Thus, when the vehicle is parked, the internal pressure of the fuel tank 110 can be prevented from becoming equal to or higher than a predetermined pressure due to the flow of vapor gas from the side of the fuel tank to the side of the canister.

(2) In a Running State of the Vehicle

In a running state of the vehicle, for example, if the ignition switch has been turned on, the control device 122 judges that the vehicle is in a running state. First of all, the pressure relief valve 132, which is smaller in diameter than the refueling valve 130 that is closed, is opened. Hence, the flow rate of vapor gas passable through the pressure release valve 132 is restricted to a flow rate enabling adsorption of the vapor gas in the canister 26. As a result, the canister 126 can reliably adsorb hydrocarbon contained in vapor gas.

Next, if the internal pressure of the fuel tank 110 detected by the pressure sensor 160 has become equal to or lower than a predetermined pressure, the refueling valve 130 which is relatively large in diameter is also opened. As a result, the opening force of the refueling valve 130 can be reduced. After the pressure release valve 132 has been opened, the refueling valve 130 which is relatively large in diameter is opened so that vapor gas flows from the side of the fuel tank to the side of the canister. Therefore, the period required to release a pressure in the fuel tank 110 (the period required for vapor gas to flow from the side of the fuel tank to the side of the canister) can be reduced.

Furthermore, if the internal pressure of the fuel tank 110 detected by the pressure sensor 160 has become equal to an atmospheric pressure (at the end of pressure release), or if the vehicle speed detected; by the vehicle sensor has become equal to or greater than a predetermined value (upon start of the vehicle), the control device 122 closes only the refueling valve 130. As a result, the fuel tank 110 communicates with the canister 126 only by the pressure relief valve 132. Thus, it is possible to inhibit a more than necessary amount of vapor gas from flowing from the side of the fuel tank to the side of the canister.

(3) During Refueling Operation

If the fuel lid open-close operation switch 123 is turned on and the control device 122 judges that refueling operation has been started, the control device 122 first of all opens the pressure release valve 132, which is relatively small in diameter. Thus, the diameter of the pressure release valve. 132 restricts the flow rate of vapor gas passable through the pressure release valve 132 to a flow rate enabling the vapor gas to be adsorbed in the canister 126. As a result, the canister 126 can reliably adsorb hydrocarbon contained in vapor gas.

Then, if the internal pressure of the fuel tank 110 detected by the pressure sensor 160 has become equal to or lower than a predetermined pressure, the control device 122 also opens the refueling valve 130 which is relatively large in diameter. As a result, the opening force of the refueling valve 130 can be reduced. Also, the period required to release a pressure in the fuel tank 110 (the period required for vapor gas to flow from the side of the fuel tank to the side of the canister) can be reduced.

Then, if the internal pressure of the fuel tank 110 detected by the pressure sensor 160 has become equal to an atmospheric pressure, the control device 122 activates the fuel lid open-close device 120 and opens the fuel lid 118, thereby making it possible to refuel. In this case, since the large-diameter refueling valve 130 is opened, the ventilation resistance from the fuel tank 110 to the canister 126 is small. This makes it possible to perform refueling operation smoothly.

Further, if the fuel lid 118 is closed at the end of refueling operation, and if a fuel lid closure detection switch (not shown) has been turned on, the control device 122 judges that refueling operation has been terminated. Then, the control device 122 closes the pressure relief valve 132 and the refueling valve 130.

The aforementioned refueling judgment need not always be carried out by means of the fuel lid operation open-close switch 123 and the fuel lid closure detection switch. That is, since the fuel filler cap 116 is removed during refueling operation, it is possible to make judgments of the start and the end of refueling operation by detecting removal of the fuel filler cap 116. Further, it is also possible to make judgments of the start and the end of refueling operation based on a signal from a switch for detecting an open or closed state of the fuel lid 118 and the like.

Accordingly, in the vapor gas inhibiting device of this embodiment, the large-diameter refueling valve 130 and the small-diameter pressure relief valve 132 are selectively opened or closed, whereby it becomes possible to easily perform flow rate control in the control valve 134.

Although some specific embodiments of the present invention have been described hitherto in detail, it is obvious to those skilled in the art that the present invention is not limited to those embodiments and that a variety of other embodiments are possible within the scope of the present invention. For example, the constructions of the refueling valve 130,and the pressure relief valve 132 are not limited to those of this embodiment. That is, it is also possible to employ another construction wherein a large-diameter refueling valve and a small-diameter pressure relief valve are disposed in parallel. Also, the construction of the vent valve 138 is not limited to that of this embodiment.

A vapor gas inhibiting device of a fuel tank in accordance with a fifth embodiment of the present invention will be described with reference to FIGS. 6, 7.

In this embodiment, components identical to those of the fourth embodiment will be denoted by the same reference numerals and the description thereof will be omitted.

Figure 6:
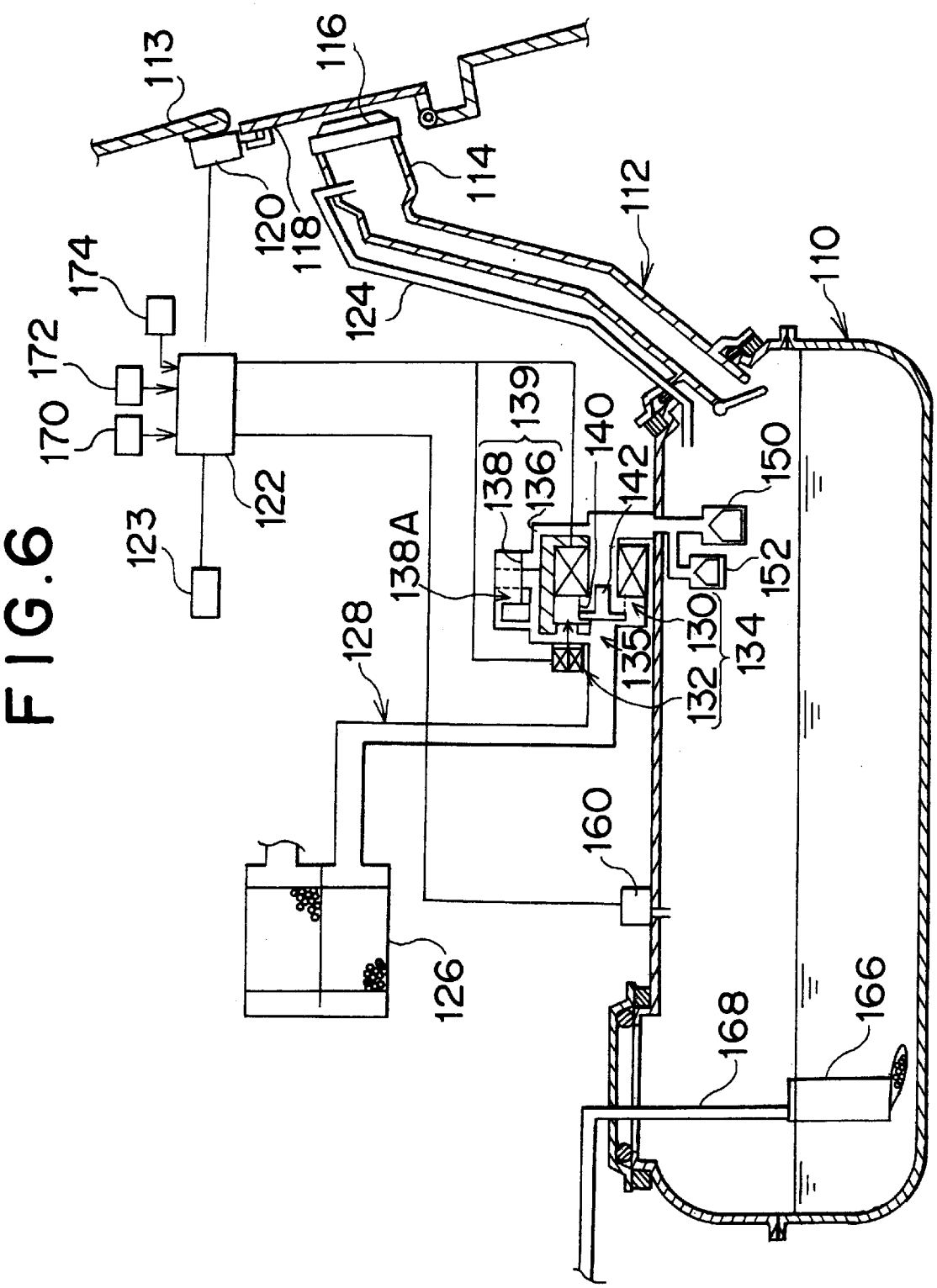
FIG. 6 is a structural view of a vapor gas inhibiting device of a fuel tank in accordance with a fifth embodiment of the present invention.
Figure 7:
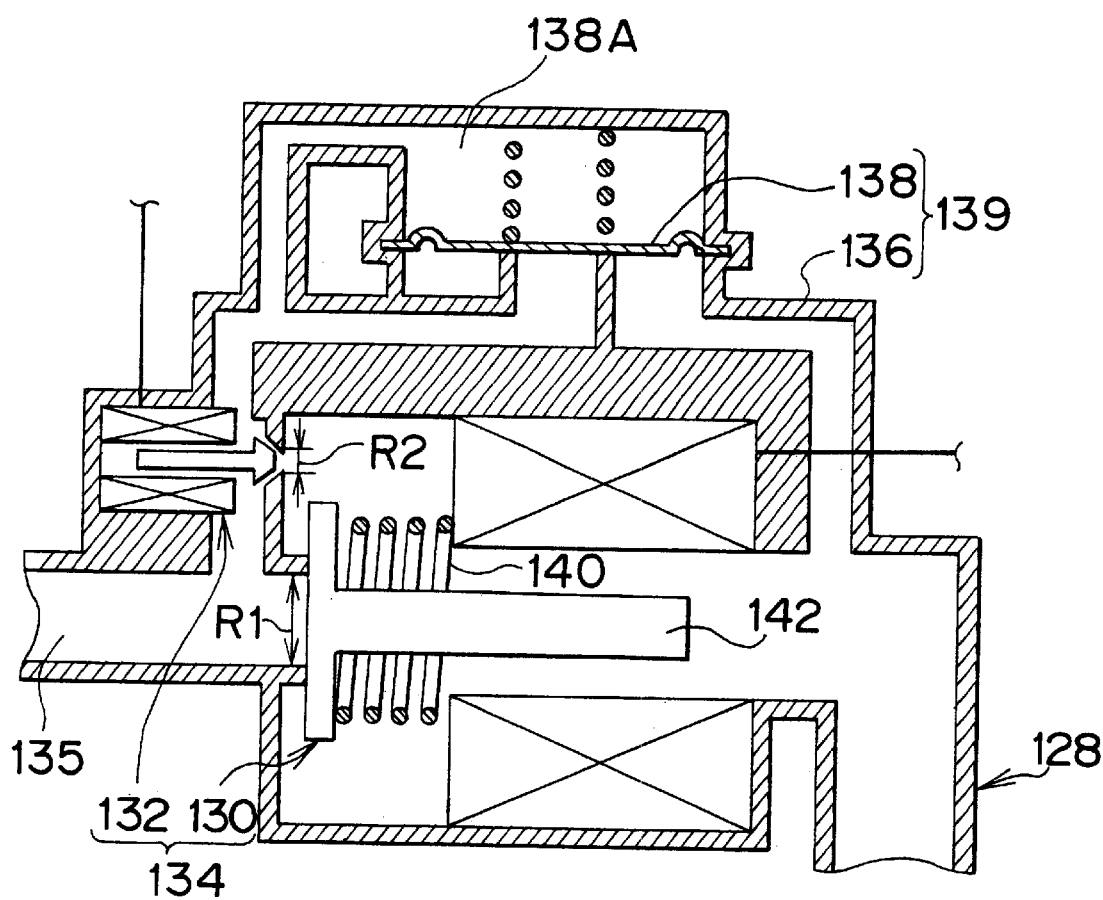
FIG. 7 is an enlarged cross-sectional view of a control valve in the vapor gas inhibiting device of the fuel tank in accordance with the fifth embodiment of the present invention.
Figure 8:
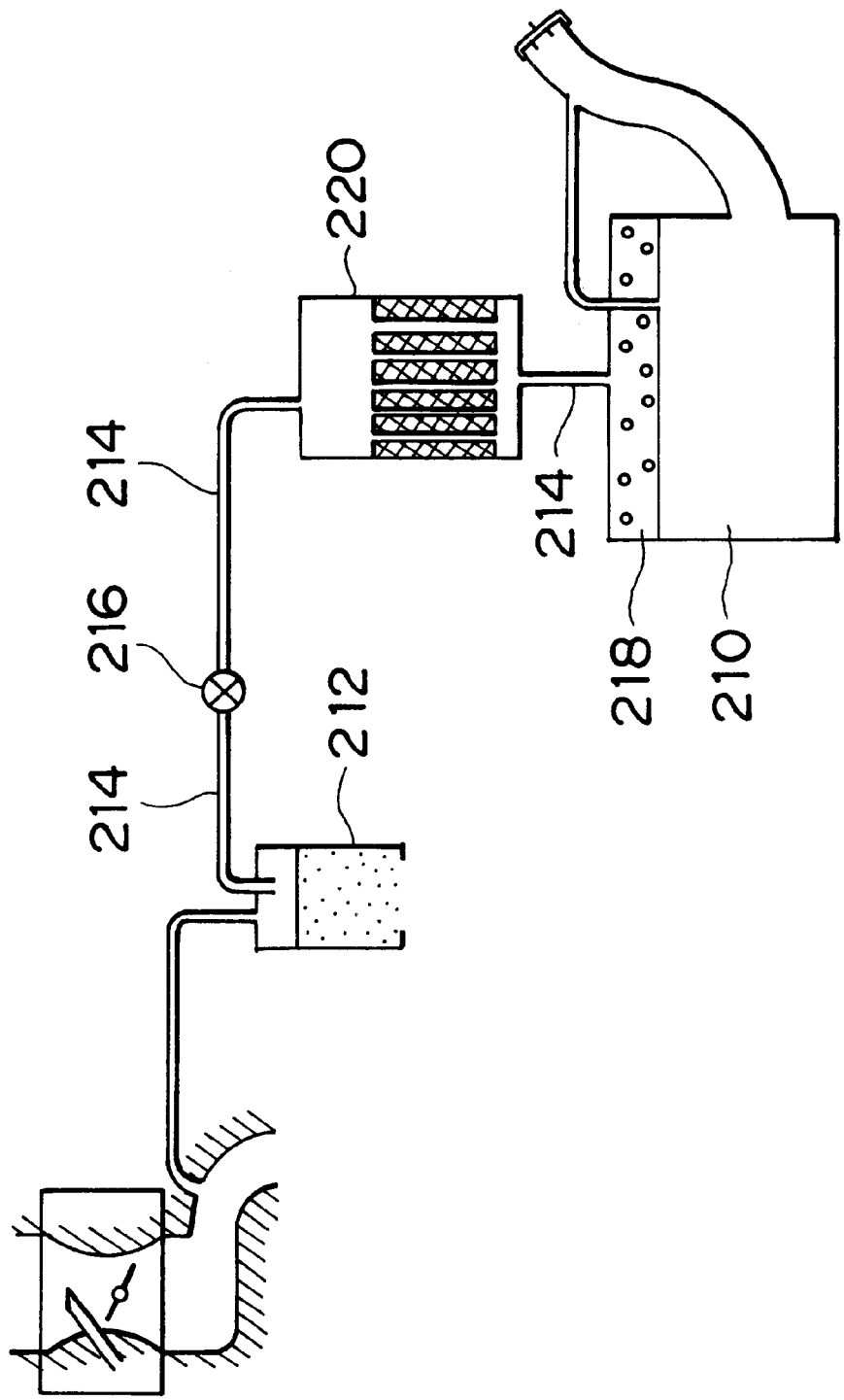
FIG. 8 is a schematic structural view of a fuel tank system in accordance with the related art.

As shown in FIG. 6, the control device 122 serves as engine driving means and is capable of outputting an engine start signal and an engine stop signal to an engine control unit (not shown). Further, the inlet pipe 112 is provided with a vent pipe 124.

Further, the control device 122 is connected to an automatic transmission position detection switch 172 and a side brake position detection switch 174 as well as a vehicle speed sensor 170. Thus, data on a vehicle speed, an automatic transmission position and a side brake position are inputted to the control device 122.

Next, operation of this embodiment will be described.

For convenience of explanation, the following description will be made as to the operation (1) in a parked state of the vehicle, (2) in a running state of the vehicle, and (3) during refueling operation.

(1) In a Parked State of the Vehicle

While the vehicle is parked, and an ignition switch of the vehicle has been turned off, the control device 122 is turned off so that the refueling valve 130 and the pressure relief valve 132 are closed. However, if the internal pressure on the side of the fuel tank has become higher than an internal pressure on the side of the canister by a predetermined value or more, the vent valve 138 is opened due to the difference in pressure. That is, if the internal pressure of the fuel tank 110 is lower than a predetermined pressure, the vent valve 188 is closed. Otherwise, the vent valve 138 is opened. Thus, when the vehicle is parked, the internal pressure of the fuel tank 110 can be prevented from becoming equal to or higher than a predetermined pressure due to the flow of vapor gas from the side of the fuel tank to the side of the canister.

(2) In a Running State of the Vehicle

In a running state of the vehicle, for example, if the ignition switch has been turned on, the control device 122 judges that the vehicle is in a running state. First of all, the pressure relief valve 132, which is smaller in diameter than the refueling valve 130 that is closed, is opened. Hence, the diameter of the pressure relief valve 132 restricts the flow rate of vapor gas passable through the pressure relief valve 132 to a flow rate enabling adsorption of the vapor gas in the canister 126. As a result, the canister 126 can reliably adsorb hydrocarbon contained in vapor gas.

Next, if the internal pressure of the fuel tank 110 detected by the pressure sensor 160 has become equal to or lower than a predetermined pressure, the refueling valve 130 which is relatively large in diameter is also opened. As a result, the opening force of the refueling valve 130 can be reduced. After the pressure release valve 132 has been opened, the refueling valve 130 which is relatively large in diameter is opened so that vapor gas flows from the side of the fuel tank to the side of the canister. Therefore, the period required to release a pressure in the fuel tank 110 (the period required for vapor gas to flow from the side of the fuel tank to the side of the canister) can be reduced.

Furthermore, if the internal pressure of the fuel tank 110 detected by the pressure sensor 160 has become equal to an atmospheric pressure (at the end of pressure release), or if the vehicle speed detected by the vehicle sensor has become equal to or greater than a predetermined value (upon start of the vehicle), the control device 122 closes only the refueling valve 130. As a result, the fuel tank 110 communicates with the canister 126 only by the pressure relief valve 132. Thus, it is possible to inhibit a more than necessary amount of vapor gas from flowing from the side of the fuel tank to the side of the canister.

(3) During Refueling Operation

If the fuel lid open-close operation switch 123 is turned on and the control device 122 judges that refueling operation has been started, the control device 122 first of all opens the pressure relief valve 132, which is relatively small in diameter. Thus, the diameter of the pressure relief valve 132 restricts the flow rate of vapor gas passable through the pressure relief valve 132 to a flow rate enabling the vapor gas to be adsorbed in the canister 126. As a result, the canister 126 can reliably adsorb hydrocarbon contained in vapor gas.

Then, if the internal pressure of the fuel tank 110 detected by the pressure sensor 160 has become equal to or lower than a predetermined pressure, the control device. 122 also opens the refueling valve 130 which is relatively large in diameter. As a result, the opening force of the refueling valve 130 can be reduced. Also, the period required to relief a pressure in the fuel tank 110 (the period required for vapor gas to flow from the side of the fuel tank to the side of the canister) can be reduced.

Then, if the internal pressure of the fuel tank 110 detected by the pressure sensor 160 has become equal to an atmospheric pressure, the control device 122 activates the fuel lid open-close device 120 and opens the fuel lid 118, thereby making it possible to refuel.

On the other hand, if the pressure relief valve 132 or the refueling valve 130 remains closed due to malfunction such as sticking or disconnection and the like, and if the pressure sensor 160 detects that the internal pressure of the fuel tank 110 has not been lowered, the control device 122 keeps the fuel lid 118 closed by means of the fuel lid open-close device 120 and starts the engine through its output signal. As a result, the vent valve 138 can be opened by an intake negative pressure in the engine, and the fuel tank 110 communicates with the canister 126.

Thus, even if the solenoid valve 134 is not opened during refueling operation, vapor fuel gas in the fuel tank 110 can be fed to the canister 126. Therefore, the internal pressure of the fuel tank 110 can be lowered. Accordingly, if the internal pressure of the fuel tank 110 detected by the pressure sensor 160 has become equal to an atmospheric pressure, the control device 122 activates the fuel lid open-close device 120 and opens the fuel lid 118, thereby making it possible to refuel. Thus, even if the fuel filler cap 116 has been opened, the back flow of vapor gas or fuel from the fuel filler opening 114 can be prevented.

Furthermore, only in the case where the vehicle speed has been judged to be equal to, for example, 0 based on the vehicle speed data from the vehicle speed sensor 170, in the case where the automatic transmission position has been judged to be a parking position based on the automatic transmission position data from the automatic transmission position detection switch 172, and in the case where the side brake has been judged to be at, the on-position based on the side brake position data from the side brake position detection switch 174, the control device 122 judges that the vehicle has been braked, and starts the engine. Consequently, it becomes possible to improve safety.

If the pressure relief valve 132 or the refueling valve 130 is free from malfunction and the fuel lid 118 has been closed after normal termination of refueling operation, a fuel lid closure detection switch (not shown) turns on. Thereby the control device 122 judges that refueling operation has been terminated, and closes the pressure relief valve 132 and the fuel filler valve 130. Further, the aforementioned refueling judgment need not always be carried out by means of the fuel lid operation open-close switch 123 and the fuel lid closure detection switch. That is, since the fuel ffiller cap 116 is removed during refueling operation, it is possible to make judgments of the start and the end of refueling operation by detecting removal of the fuel filler cap 116. Further, it is also possible to make judgments of the start and the end of refueling operation based on a signal from a switch for detecting an open or closed state of the fuel lid 118 and the like.

In this embodiment, only in the case where the vehicle speed has been judged to be equal to, for example, 0 based on the vehicle speed data from the vehicle speed sensor 170, in the case where the automatic transmission position has been judged to be a parking position based on the automatic transmission position data from the automatic transmission position detection switch 172, and in the case where the side brake has been judged to be at the on-position based on the side brake position data from the side brake position detection switch 174, the control device 122 judges that the vehicle has been braked, and starts the engine. However, the control device 122 may be designed to judge that the vehicle has been braked, and start the engine, if one or more of those conditions are judged to have been satisfied. Further, for example, the aforementioned conditions may be combined with another condition that the manual transmission position has been judged to be a neutral position based on the manual transmission position data from a manual transmission position detection switch. The control device 122 may be designed to judge that the vehicle has been braked, and start the engine, if those respective conditions have been satisfied.

Further, if the pressure sensor 60 detects that the internal pressure of the fuel tank 110 has not been lowered, the control device 122 keeps the fuel lid 118 closed by means of the fuel lid open-close device 120 and starts the engine through its output signal. Instead, however, the control device 122 may be designed to merely keep the fuel lid 118 closed by means of the fuel lid open-close device 20 (without driving the engine). In this case, the fuel lid 118 is kept closed, whereby the operator is informed that the internal pressure of the fuel tank 110 has not been lowered. Therefore, the operator is able to start the engine for a predetermined period. By operating again the fuel lid open-close operation switch 123 after the engine has been stopped, the internal pressure of the fuel tank 110 can be lowered.

Further, the constructions of the refueling valve 130, the pressure relief valve 132 and the vent valve 138 are not limited to those of this embodiment.

What is claimed is:

1. A vapor gas inhibiting device for a fuel tank in a vehicle, comprising:

a control valve provided in a passage by which a fuel tank communicates with a vapor gas collecting device and which is opened during refueling operation, the control valve including a refueling valve and a pressure relief valve disposed in parallel with one another, the refueling valve and the pressure relief valve being disposed at the passage by which the fuel tank communicates with the vapor gas collecting device;

wherein the pressure relief valve has a passage smaller in diameter than a passage of the refueling valve and the diameter of the pressure relief valve is set such that a flow rate of vapor gas flowing through the pressure relief valve is restricted to a flow rate enabling the vapor gas to be adsorbed in the vapor gas collecting device.

2. The vapor gas inhibiting device according to claim 1, the diameter of the refueling valve is set such that a flow rate of vapor gas flowing through the refueling valve can be set to a flow rate enabling pressure release of the fuel tank to be completed within a predetermined period.

3. The vapor gas inhibiting device according to claim 1, wherein the refueling valve is opened after the pressure relief valve has been opened.

4. The vapor gas inhibiting device according to claim 1, wherein the refueling valve is closed in a running state of the vehicle.

* * * * *

UNITED STATES PATENT AND TRADEMARK OFFICE
CERTIFICATE OF CORRECTION

PATENT NO.    : 6,533,002 B1
DATED         : March 18, 2003
INVENTOR(S)   : Masahide Kobayashi et al.

It is certified that error appears in the above-identified patent and that said Letters Patent is hereby corrected as shown below:

<u>Column 22,</u>
Line 10, after "claim 1," insert -- wherein --.

Signed and Sealed this

Seventeenth Day of June, 2003

JAMES E. ROGAN
*Director of the United States Patent and Trademark Office*